Sept. 22, 1959    G. A. FEVIG ET AL    2,905,677
COUNTER CURRENT EXTRACTION PROCESS OF STEROLS
Filed May 2, 1957    3 Sheets-Sheet 2

GLEN A. FEVIG
JOHN W. GREINER
KENNETH W. RIEBE
    *INVENTOR.*

BY
*ATTORNEY*

Sept. 22, 1959 G. A. FEVIG ET AL 2,905,677
COUNTER CURRENT EXTRACTION PROCESS OF STEROLS
Filed May 2, 1957 3 Sheets-Sheet 3

BATCHWISE COUNTERCURRENT STIGMASTEROL SEPARATION PROCESS

GLEN A. FEVIG
JOHN W. GREINER
KENNETH W. RIEBE
INVENTOR.

BY
ATTORNEY

United States Patent Office 2,905,677
Patented Sept. 22, 1959

2,905,677

COUNTER CURRENT EXTRACTION PROCESS OF STEROLS

Glen A. Fevig, Kalamazoo, John W. Greiner, Kalamazoo Township, Kalamazoo County, and Kenneth W. Riebe, Kalamazoo, Mich., assignors to The Upjohn Company, Kalamazoo, Mich., a corporation of Michigan Application May 2, 1957, Serial No. 656,609

10 Claims. (Cl. 260—397.25)

This invention relates to a novel process for the countercurrent fractional separation of crude mixtures of sterols. It relates more particularly to improvements in the countercurrent selective solvent separation of natural mixtures of sterols, which mixtures may contain tarry materials and other naturally occurring impurities which may or may not be chemically or physically modified, in addition to the sterols.

Figure 1:
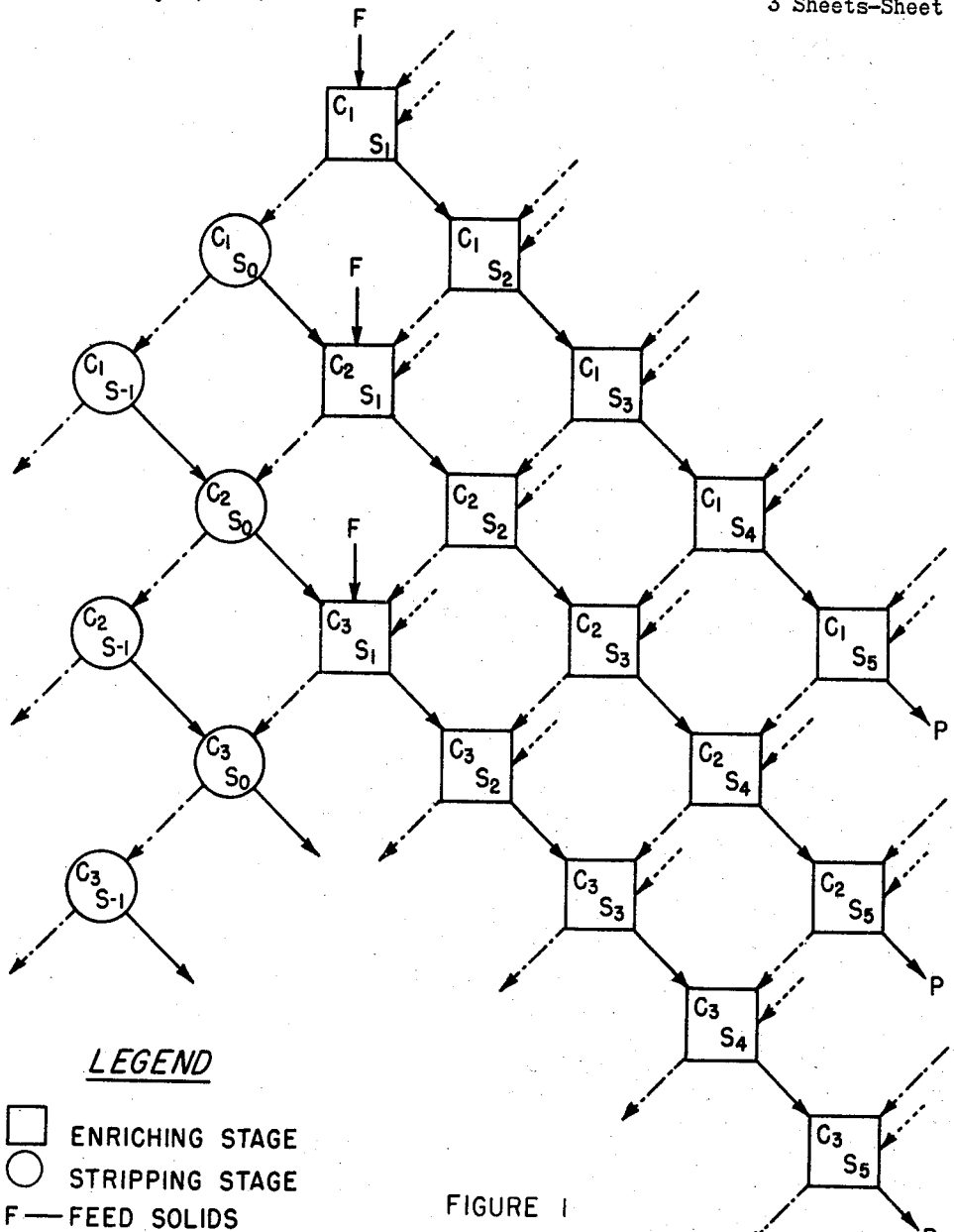
Figure 2:
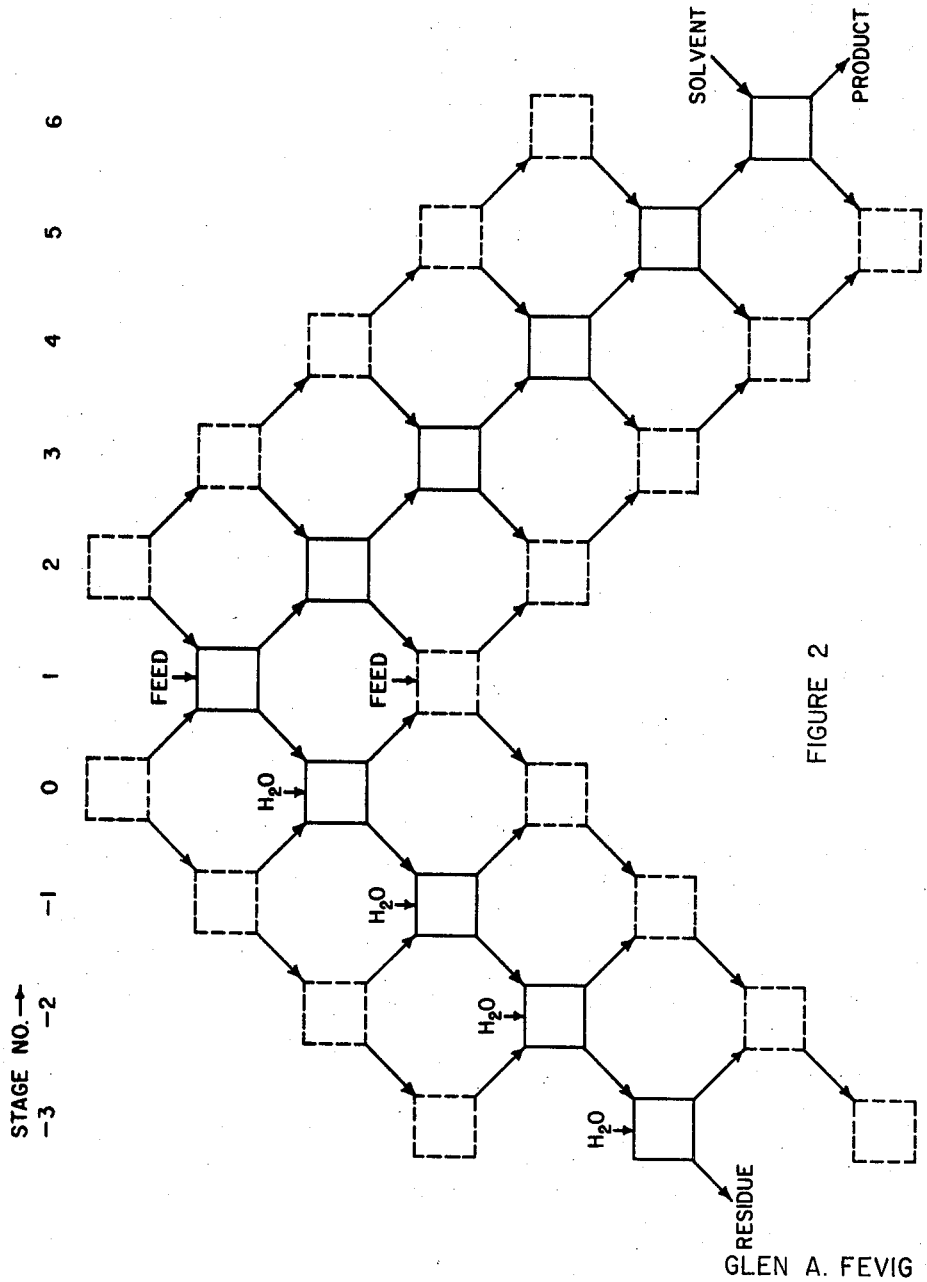
Figure 3:
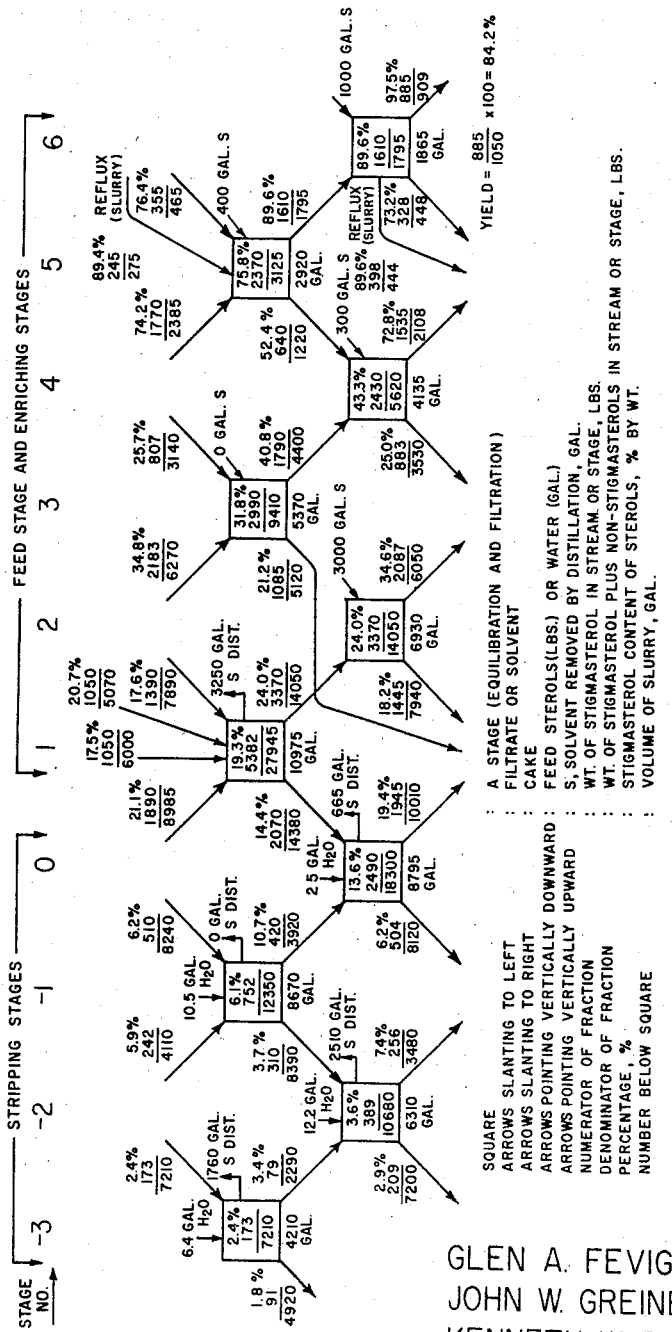

Figure 1 illustrates three cycles of the process of the invention in diagrammatic fashion. Figure 2 shows a single cycle in a process in accordance with the invention. Figure 3 illustrates diagrammatically a practical embodiment of the invention.

Natural sterol mixtures occur as residues in the refining of natural oils and waxes, usually occurring as a mixture of two or more sterols possessing molecular structural differences which may vary from profound to slight. In addition to the sterols, the crude sterol mixtures also contain in most instances coloring matter and other materials, regarded, for the purpose of this invention, as impurities.

Many sterols such as stigmasterol and ergosterol are useful as starting materials in the synthesis of steroid compounds that possess great pharmacological value. Owing to the aforesaid differences in sterol structure, it is necessary to accomplish the desired steroid synthesis in a manner that is dependent upon the structure of the individual sterol starting materials, and it is therefore necessary to start with a sterol of high purity. One of the important sterols currently useful as a starting material in making steroid compounds of great pharmacological value is stigmasterol, occurring as a lesser constituent in crude soy sterols, the major constituents of soy sterols being sitosterols.

The starting mixtures for the process of the present invention are solid mixtures consisting essentially of stigmasterol and sitosterols (plus impurities such as those already noted). Stigmasterol and the sitosterols commonly occur together as mixtures obtained from various natural sources, e.g., from soybeans as previously mentioned, sugar cane, calabar and coffee beans, etc. Stigmasterol ordinarily comprises only from about five to about 35 percent of the total crude sterols from these sources, the remainder being mostly sitosterols.

One of the aspects of this invention is the provision of improvements in the countercurrent separation of stigmasterol from mixtures of sterols containing sitosterols as well as other sterols, and the aforesaid impurities in minor amounts.

According to this invention in its broad aspect, stigmasterol or other selected desired sterol is recovered as a leached or crystallized product of high purity by a separation method which comprises a series of countercurrent selective solvent separations in which the starting sterol mixture travels through a series of enriching stages to the final purified end product. Solvents simultaneously travel through the enriching stages in reverse order, and continue through a series of stripping stages to a final stage wherein all the constituents of the original sterol mixture except the desired sterol are held in solution, and a precipitated cake passes forward sequentially through the stripping stages eventually to join the feed solids travelling through the enriching stages.

The present invention relates especially to the stripping stages, and involves methods for increasing the efficiency of the stripping operation. This operation, in order to give the best effective and practical overall results, must afford the removal of solids richer in the desired sterol than the total dissolved solids in the unstripped solution. Successive stripping stages should ultimately lead to a final residual solution that is sufficiently low in dissolved desired sterol as to be economically suitable as a process residue.

Broadly speaking, a stripping stage, to be effective in accomplishing a separation, results in a precipitated sterol product having a different composition compared with the sterols still held in solution. The difference results in either an enriched or depleted content of the desired sterol in the precipitated sterol cake. It can be seen that in the former case the enriched precipitated cake can be passed through the enriching stages, or in the latter case the enriched mother liquor can be treated to recover the dissolved solids, and those solids, being enriched in the desired sterols, can be passed through the enriching stages. In practice we have found it preferable to carry out the stripping so that the stripped solids, enriched in the desired sterol (e.g., stigmasterol), are obtained directly as a cake and the cake passed directly through the enriching stages. This avoids the engineering complications of separating from enriched mother liquor sterols the highly soluble impurities contained therein.

Reference is made to Figure 1 of the accompanying drawings which illustrates three cycles of such a process as described above, employing five enriching stages and two stripping stages in each cycle. In Figure 1 the enriching stages are shown as squares and the stripping stages are shown as circles. Each portion of the starting mixture is shown as F, the feed solids.

An enriching stage is a point in the process where a selective solvent separation is conducted, i.e., the chosen solvent is mixed with the sterol solids to partially dissolve these solids by leaching, or the sterol solids are completely dissolved in the chosen solvent and the resulting solution is cooled and equilibrated, to precipitate a portion of the sterol solids enriched in stigmasterol; and the undissolved solids, enriched in stigmasterol, are then separated from the solvent and dissolved solids (filtrate). The first enriching stage is shown as $S_1$ in the drawing and the fifth as $S_5$.

A stripping stage according to this invention involves the separation (stripping) from the mother liquor of a portion of the solids dissolved therein, obtained from one of the preceding stripping stages or the first enriching stage (feed stage). The process illustrated in Figure 1 represents two stripping stages, the first employing the mother liquor obtained from the first enriching stage of that cycle and the second employing the mother liquor obtained from the first stripping stage. The first stripping stage of each cycle is shown as $S_0$ in the drawing and the second as $S_{-1}$.

A cycle refers herein to a segment of a countercurrent extraction wherein a portion of the starting mixture, enriched in stigmasterol, is obtained at one end of the system as undissolved solids, and the portion depleted in stigmasterol, dissolved in the spent solvent, is obtained at the other end. The stages of the first cycle are shown bearing the symbol $C_1$; of the second cycle, $C_2$; and the third cycle, $C_3$. Thus the first enriching stage of the first cycle is shown in the drawing as $C_1S_1$; the first stripping stage of the second cycle as $C_2S_0$; the second stripping stage of the third cycle as $C_3S_{-1}$, etc.

Solvents employed in the process of the present invention are selective organic solvents having a greater solvent affinity for the residual sterols, i.e., sitosterols, determined on a portion of the starting sterol mixture to be used in the countercurrent leaching (or crystallization) process, employing a volume of the organic solvent which dissolves approximately one-half of the solids (e.g., forty to sixty percent) of the portion of the sterol mixture tested.

For a clear understanding of the following description, addressing attention illustratively to soy sterols as the sterol mixture and stigmasterol as the desired sterol, the ensuing definitions of symbols are given.

$$E_s = \frac{\text{weight of stigmasterol in the cake}}{\text{weight of stigmasterol in the filtrate}}$$

This symbol ($E_s$) is a measure of the stigmasterol dissolved in any one stage.

$$E_n = \frac{\text{weight of non-stigmasterol materials in the cake}}{\text{weight of non-stigmasterol materials in the filtrate}}$$

This symbol ($E_n$) is a measure of the non-stigmasterol materials dissolved in any one stage.

$$\beta = \frac{E_s}{E_n} = \frac{(\text{weight of stigmasterol in the cake})}{(\text{weight of non-stigmasterol materials in the cake})} \times \frac{(\text{weight of non-stigmasterol materials in the filtrate})}{(\text{weight of non-stigmasterol in the filtrate})}$$

This symbol, the $\beta$ value, is the relative distribution coefficient of the solvent (used in that stage) and varies with the solvent-solid ratio and with the ratio of stigmasterol to non-stigmasterol materials that characterizes the solid. It is a measure of the degree of selectivity of a selective organic solvent.

This $\beta$ value is determined experimentally by partially dissolving the sterol mixture, e.g., a mixture of stigmasterol and sitosterols such as crude soy sterols, in an organic solvent, as described above, and then determining the stigmasterol and sitosterols content of the dissolved and of the undissolved solids. The $\beta$ value of the solvent, for that particular mixture and solvent-solid ratio, can be determined by the following formula:

$$\beta = \frac{S_c \times NS_{ml}}{NS_c \times S_{ml}}$$

wherein $S_c$ is the stigmasterol content (percent) of the undissolved solids (cake), $NS_c$ is the non-stigmasterol (sitosterols) content (percent) of the undissolved solids (by difference), $NS_{ml}$ is the non-stigmasterol content (percent) of the dissolved solids in the mother liquor (by difference) and $S_{ml}$ is the stigmasterol content (percent) of the dissolved solids.

If the relative distribution coefficient of an organic solvent is greater than 1.0 for a mixture of stigmasterol and sitosterols at a particular volume of solvent, then that organic solvent produces undissolved solids of enriched stigmasterol content over the original mixture. The solvents employed in the process of the present invention are those selective organic solvents having a relative distribution coefficient greater than 1.5 at a volume of solvent which dissolves about one-half of the total solids of a sample of the sterol mixture employed as starting mixture in the process. These solvents are capable of producing a final product of high stigmasterol content efficiently and economically. It is likewise desirable, for economic and operating reasons, that the selective organic solvent employed in the process of the present invention be readily available and reasonably inexpensive, be noncorrosive to equipment, be chemically inert to sterols, possess a high solvent power for sterols, present no difficulty manageable safety problems such as fire, explosion, and toxicity, and possess long-term stability in order to permit repeated recycling, reclaiming, and reusing.

The data required for determining $\beta$ value are conveniently obtained as follows, employing a stigmasterol-sitosterols mixture and a volume of the organic solvent which at room temperature dissolves approximately one-half of the sterols mixture, as already stated in the foregoing. The sterols-solvent slurry is brought to equilibrium, preferably by vigorous agitation for at least one-half hour at temperatures between about twenty and about 35 degrees centigrade. Alternatively, equilibration can be achieved by heating the slurry to a sufficiently high temperature to dissolve the sterols, slowly cooling the resulting solution, with stirring, to between about twenty and about 35 degrees centigrade, and maintaining the resulting slurry at substantially the same reduced temperature conditions for at least one-half hour. The solid phase (cake or undissolved solids) and the liquid phase (mother liquor containing dissolved solids) of the equilibrated slurry are separated by conventional means, such as filtration or centrifugation. The cake is dried and its stigmasterol content is determined by assay, e.g., infrared assay; the non-stigmasterol (sitosterols) content is determined by difference. The dissolved solids of the mother liquor are isolated by evaporating the mother liquor to dryness and the stigmasterol content of the dry residue is determined by assay, e.g., infrared assay; the nonstigmasterol (sitosterols) content is determined by difference. With these data at hand the $\beta$ value of the solvent, for the particular mixture and solvent-solid ratio, is conveniently calculated in accordance with the preceding formula.

Preferred organic solvents are those selective organic solvents which are carbon compounds having from one to eight carbon atoms, inclusive, and which have at least one additional element selected from the group consisting of hydrogen, oxygen, chlorine and bromine; which are liquids at ordinary temperatures and pressures, and which have relative distribution coefficients ($\beta$ values) greater than 1.5. Representative solvents include lower aliphatic hydrocarbons, such as n-pentane, n-hexane, n-heptane, Skellysolve B (essentially a mixture of hexanes), Skellysolve C (essentially a mixture of hexanes and heptanes), petroleum ether, isooctane, cyclohexane, methylcyclohexane, 1-pentene, 1-octene, and the like; halogenated lower aliphatic hydrocarbons, such as ethylene dichloride, methylene chloride, propylene chloride, chloroform, ethylene dibromide, tetrachloroethylene, carbon tetrachloride, and the like; mixtures of lower aliphatic hydrocarbons and halogenated lower aliphatic hydrocarbons, such as fifty percent n-heptane-fifty percent ethylene dichloride mixture by volume, or the n-heptane-ethylene dichloride azeotrope, consisting of approximately 37 percent n-heptane and 63 percent ethylene dichloride by volume, and the like; lower aromatic hydrocarbons, such as benzene, toluene, xylene, and the like; lower aliphatic ketones, such as acetone, methyl isobutyl ketone, and the like; lower aliphatic alcohols, such as ethanol, isobutyl alcohol, n-butyl alcohol, n-propyl alcohol, n-amyl alcohol, 2-methoxyethanol, 2-ethoxyethanol, o-methylcyclohexanol, and the like; halogenated lower aromatic hydrocarbons, such as chlorobenzene, bromobenzene, o-dichlorobenzene, and the like; lower aliphatic ethers, such as diisopropyl ether, dioxane, and the like; and lower aliphatic esters, such as ethyl acetate, amyl acetate, ethyl butyrate, and the like. Of these solvents, lower aliphatic hydrocarbons and halogenated lower aliphatic hydrocarbons are preferred, especially ethylene dichloride and n-heptane, and mixtures thereof, particularly their azeotropic mixture having, as already noted, a composition of approximately 37 percent n-heptane and 63 percent ethylene dichloride by volume.

In carrying out an illustrative embodiment of this invention, soy sterols together with the extracting solvent, i.e., leaching or crystallizing solvent, are placed in a container and made into a slurry. The slurry is agitated for a period of time until equilibrium is reached. Alternatively, the soy sterols are completely dissolved in the solvent, advantageously with the aid of heat, and the resulting solution is cooled and equilibrated to precipitate a portion of the sterol solids. At the end of this period the mother liquor is separated from undissolved solids by filtration, and the cake is placed in a different container together with fresh solvent. The filtrate, containing dissolved stigmasterol, sitosterol and other materials, is freed of some of its dissolved sterols by the stripping operation, i.e., precipitation or crystallization of dissolved sterols. This can be accomplished by reducing the temperature, distilling off some of the solvent, or by other known methods. Separation of the resulting mixture into a mother liquor and a cake is then carried out.

The cake from the original separation (stage 1 cake) is treated with fresh solvent to provide a second cake (stage 2 cake) and a second mother liquor (stage 2 filtrate). The stage 2 filtrate together with fresh make-up solvent is used to treat a combined feed consisting of fresh feed sterol and the cake (stage 0 cake) from the preceding stripping stage. Referring to Figure 1, it can be seen that upon eventual attainment of steady state conditions, a true batchwise countercurrent process has been developed.

A batchwise countercurrent separation process has the advantage of permitting carefully controlled conditions of time of contact, ratio of solvent to solids, efficient mechanical separation of the solids from the filtrate, etc. to be employed. After selecting the optimum solvent, volume of solvent, temperature, time, number of stages, etc., to produce the desired purity of stigmasterol in the first cycle of operation, these conditions can be maintained in successive cycles during the countercurrent operation, giving reasonable assurance of a product of controlled purity, or the conditions can be varied as may be desired.

The batchwise countercurrent separation process that characterizes the present invention usually involves at least four enriching stages per cycle and ordinarily, at least five. Six enriching stages, when employing a reasonably efficient solvent, are ordinarily sufficient to achieve the production of very high purity stigmasterol.

In a batchwise countercurrent separation process, desirable results are obtained when at least four enriching stages per cycle are employed and when the separation is performed in a manner such that, in the slurry produced in these stages, more than fifty percent of the stigmasterol remains undissolved ($E_s = >1$). An $E_s$ value of 1.2–3.0 is a satisfactory normal operating range and advantageous results are obtained if $E_s$ is between 1.2 and 6.0, e.g., if between about 55 and 85 percent of the stigmasterol remains undissolved in these stages, all of which can be accomplished by temperature and solvent volume adjustment as will be readily apparent to one skilled in the art. In addition, especially advantageous quality product is obtained if the ratio of undissolved to dissolved stigmasterol in these stages is maintained at least 1.5 times the ratio of undissolved to dissolved sitosterols, which attends the use in these stages of a solvent having a relatively high β value, i.e., above 1.5.

In following the process as described above, we have discovered a surprisingly effective method for improving the efficiency of the separation, especially in the stripping stages and in the early enriching stages, i.e., stage 1 and stage 2. Ideally, stripping should accomplish the precipitation only of the desired sterol, hence necessitating but one stripping stage; but this is not attainable in practice. Though enrichment of the desired sterol, i.e., stigmasterol, in the stripped cake can be accomplished by a wide variety of methods, all conventional methods known to us are of such a character that they cannot easily be integrated into the overall countercurrent system. It can be readily seen, however, that the selective removal of stigmasterol in the stripping stages is highly desirable because of the resulting improvement in overall yield of stigmasterol from the starting sterol mixture.

The primary advantage offered by a stripping stage is that it permits a higher yield of the desired sterol, i.e., stigmasterol, per cycle. The number of stripping stages is usually less than the number of enriching stages. Generally speaking, if the number of stripping stages per cycle is increased, using any given selective solvent, the yield increases. The stripping stages have a profound effect upon the overall yield because efficient stripping tends to direct previously dissolved stigmasterol toward the enriching end of the cycle. Without efficient stripping, most of the stigmasterol that is dissolved in stage 1 would appear in the solvent residue.

Stripping can be accomplished by means of adding materials such as precipitants to the filtrates in the stripping stages but in most instances this introduces a variety of complicating factors. For example, solvent recoveries are complicated, and the possibility always exists that the succeeding enriching stages will be thrown out of balance by the presence of added substances in the solvent system, that is, such substances are passed from stage to stage. We have discovered that the presence of water can and does in most instances produce an undesirable effect in the enriching stages of the process, particularly those stages occurring after the second enriching stage. Sterols, including stigmasterol and sitosterols, tend to form solvates with water, and the solubilities of these solids in the solvents are thus greatly altered. We have discovered, on the other hand, that the presence of water in carefully controlled amounts in the stripping stages and early enriching stages aids in the separation of stigmasterol from non-stigmasterol material.

We have discovered that the surprising and desirable effect of water in controlled amounts in this process is an improved separation of stigmasterol from non-stigmasterol materials, i.e., a decreased affinity of the solvent for stigmasterol. This occurs optimally when the total sterols present in any stage consist of not more than one-fourth stigmasterol by weight. This ordinarily involves the early enriching stages, i.e., stages 1 and 2, and the stripping stages, as previously mentioned. We have found that if too much water is used, this effect is lost. We have further found that if too little water is used, the desirable effect is diminished or sometimes not achieved.

Referring now to Figure 2, this drawing represents a single cycle in a process such as characterizes this invention. Portions of the preceding and succeeding cycles are shown in dotted lines. The arrows indicate for each stage the streams which enter and leave. Arrows slanting to the right represent the path of separated solids, while those slanting to the left represent the path of the filtrates. The cycles which follow are identical to the one shown with respect to the flow pattern. Each square in the drawing represents a stage in which the operations of slurrying, equilibration and filtration, are carried out successively. In practice, filtrations are conveniently carried out in the order, 6, 4, 2, 0, −2, 5, 3, 1, −1, −3, whereupon the cycle is completed and the next one begins 6, 4, etc.

The stability of a continuing process and its ability to produce consistently high yields of high quality material involve careful control of the ratio of the desired sterol in the cakes to that in the filtrates from which they are separated, i.e., the $E_s$ value. This stability can best be achieved by a routine pilot determination of $E_s$ value at a given temperature for a given slurry, and then adjusting the temperature of the main slurry prior to filtration so that the desired $E_s$ value is achieved. In stage 1, the sterol feed, and the stage 0 cake (from the preceding cycle), are slurried with stage 2 filtrate (from the preceding cycle) and make-up fresh solvent. The slurry is filtered at the predetermined temperature to give an $E_s$ value of approximately 1.2 to 1.7.

The stage 1 cake is reslurried in stage 3 filtrate (from the preceding cycle) and fresh make-up solvent, to make up stage 2, and the filtration is carried out as above. The resulting filtrate is passed to the succeeding cycle, and the cake is reslurried in stage 4 filtrate (from the preceding cycle) to make up stage 3. The procedure is followed through the remainder of the cycle as shown in Figure 2 up to stage 6, where the stage 5 cake is reslurried in fresh solvent. The stage 6 cake, i.e., the final stigmasterol product, is removed from the filter press and dried, and the stage 6 filtrate is used subsequently to reslurry the stage 4 cake, thus to make up stage 5 in the succeeding cycle.

The different filtrates from this cycle are held in storage as is necessary to their use in the succeeding cycles. The above operations have been described in the order of their occurrence in the cycle. The chronological order of the steps that is actually followed is set forth above.

The filtrate obtained in stage 1 is mixed with the cake from stage −1 of the preceding cycle. The resulting stage 0 slurry is heated to dissolve the solids, distilled to remove water and to adjust the solids concentration; the solution is then cooled to an intermediate holding temperature, the calculated amount of water is added and dissolved therein, the solution is further cooled to crystallization temperature, and is finally filtered. After filtration, the cake from stage 0 is sent to stage 1 of the succeeding cycle and the filtrate is passed to stage −1 of the instant cycle where it receives and is mixed with the cake from stake −2 of the preceding cycle and is stripped according to the procedure described above for the stage 0 slurry.

Stage −2 is carried out substantially the same as stage 0 and stage −1, described above, using the cake from stage −3 of the preceding cycle and the filtrate from stage −1 of the instant cycle. Stage −3 is carried out in a manner similar to the above, but using only stage −2 filtrate of the instant cycle, and the resulting mother liquor, i.e., stage −3 filtrate, leaves the process as a residue.

The solvents involved in the process of countercurrent separation described herein frequently contain minor amounts of water, up to, say, 0.05 percent of water by volume. This minor amount of water must be supplemented by additional amounts, in order to realize the beneficial effect on $\beta$ value, according to this invention.

In each of the stripping stages shown in Figure 2, the entry of water is shown by a vertical arrow. The quantity of water added in these stages, as well as in the early enriching stages in accordance with this invention, lies in the range of 0.5 to twelve, preferably 0.5 to ten, moles of water per mole of stigmasterol. It is advantageously in the range of 0.5 to four moles in stage 0. Advantageously, it broadens slightly in stage −1 where the range can be about one to five. Slightly more water can be added advantageously in stage −2, i.e., two to seven moles of water per mole or stigmasterol. As additional stripping stages are added, the molar ratio of water to stigmasterol in the additional stages can be gradually increased.

The stripping can be carried out over a broad range of temperature, i.e., from about minus twenty degrees centigrade to plus thirty degrees centigrade or higher. Concentration of total solids in stripping stage slurries broadly lies within the range of ten to thirty percent by weight, the said total solids including suspended solids as well as dissolved solids. In stages 0 and −2 the concentration is advantageously in the range of twenty to thirty percent, and in stage −1, in the range of ten to twenty percent.

One of the important features of the overall process which characterizes this invention is the proper regulation of the $E_s$ value at each stage. In general, the value of $E_s$ should be greater than 1.0 in the stripping and enriching stages. The value of $E_n$ (the ratio of non-stigmasterol materials in the cake to that in the filtrate) should in general be less than 1.0. The ratio of $E_s$ to $E_n$ is the $\beta$ value for a given separation. This value is a function of the starting mixture in any stage and the solvent used in that stage. It can be varied somewhat by varying the temperature and concentration, but on the whole it is a property of a mixture over which the operator has little control in production operation with a given solvent-solids system. Thus, one could achieve a high yield of stigmasterol by using a high $E_s$ value at every stage but the $\beta$ value relationship would cause the $E_n$ values also to be high, and a low quality product would tend to result. On the other hand, the use of $E_s$ values, while assuring a good quality product, would result in low yields. The small variations in the $\beta$ value that are possible by manipulating the temperature and concentration in practical plant operations do not alter appreciably this end result.

On the other hand, when it is possible as in this invention to introduce a new factor, i.e., alter the character of the solvent and thus increase the $\beta$ value at will, then it is possible to increase the yield and the quality of product.

In a system of countercurrent separation operations for separating a desired sterol from undesired sterols associated in solution by selective precipitation of the former, i.e., by selective stripping, it is hence desirable to increase the $\beta$ value of the system where:

$$\beta = \frac{E_s}{E_n} = \frac{\text{(weight of stigmasterol stripped from solution)}}{\text{(weight of non-stigmasterol materials stripped from solution)}}$$

$$\times \frac{\text{(weight of non-stigmasterol materials remaining in solution)}}{\text{(weight of stigmasterol remaining in solution)}}$$

As described above, it is a feature of this invention to add controlled amounts of water to the solution in such stripping stages and in the early enriching stages; and this feature of our invention is based upon our discovery that the $\beta$ value will be increased as a result. The amount of water added to increase the $\beta$ value in a particular embodiment of our invention has been described above as falling within specified ranges. In systems employing a different number of stripping stages, different solvents, or different sterol mixtures, the range of amounts of water effective to increase the $\beta$ value in accordance with this invention can readily be ascertained merely by a series of routine tests adding graduated amounts of water and determining the $\beta$ value from the formula:

$$\beta = \frac{S_c \times NS_{ml}}{NS_c \times S_{ml}}$$

given above.

Methods are known for determining quantitatively the stigmasterol content in a mixture of sterols. On method for determining stigmasterol in admixture with sitosterols is by infrared spectrum analysis as follows. The sample is dissolved, at a precise concentration of 50.0 milligrams per milliliter, in chloroform and the spectrum of this solution is recorded from 930 cm.$^{-1}$ to 1025 cm.$^{-1}$ in a double beam spectrophotometer which gives at least 95 percent transmission at 970 cm.$^{-1}$ when both the sample and reference cells are filled with chloroform alone. The cells are approximately 0.5 millimeter thick. A sample of pure stigmasterol is spectroanalyzed in exactly the same manner. On the records of the absorption pattern of both the unknown sample and the stigmasterol, a base-line, having a slope of 0.2, is drawn from the peak absorption found at 990 cm.$^{-1}$. The stigmasterol content of the sample is then calculated as follows:

$$C = 100 \frac{\log (I_b/I_P) \text{ (unknown)}}{\log (I_B/I_P) \text{ (stigmasterol)}}$$

wherein $I_B$ is the base-line transmission (percent) at 970 cm.$^{-1}$ and $I_P$ is the actual transmission (percent) at 970 cm.$^{-1}$. C is the percent stigmasterol content of the unknown sample.

Once a countercurrent separation is in operation utilizing the process of our invention, it is unnecessary to make superfluous or repetitive determinations of $\beta$ value, since then only routine checks are needed.

Employing as stage 0 feed a stage 1 filtrate from a stigmasterol separatory system such as shown in Figure 2, the following data in Table I illustrate the variations in $\beta$ value as effected by the quantity of water added during stage 0 stripping. The data given in Tables I through V were obtained using mixed soy sterols, and as solvent, the azeotrope of n-heptane and ethylene dichloride; the same applies to the data set forth in Figure 3.

In Table I, the data are grouped according to the stage 0 feed. In each group it can be seen that the addition of water caused an increase in the $\beta$ value. The table also illustrates roughly variations in $\beta$ value that result from changes in temperature and feed material.

TABLE I
*Stripping stage data—Stage 0*

| Conc. gm. solids/ gm. slurry | H₂O added, percent by vol. | Cryst. temp., °C. | $E_s$ | $E_n$ | $\beta$ | Stage 0 Feed, percent, stigmasterol by I.R. |
|---|---|---|---|---|---|---|
| 0.127 | 0 | −10 | 0.75 | 0.40 | 1.87 | 12.5 |
| 0.127 | 0.05 / 1 0.7 | −10 | 1.77 | 0.67 | 2.63 | 12.5 |
| 0.14 | 0 | −10 | 1.15 | 0.49 | 2.36 | 13.6 |
| 0.14 | 0.05 / 1 0.6 | −10 | 4.25 | 0.62 | 6.85 | 13.6 |
| 0.14 | 0 | 0 | 0.74 | 0.48 | 1.53 | 13.6 |
| 0.14 | 0 | 0 | 0.43 | 0.38 | 1.14 | 13.6 |
| 0.14 | 0.10 / 1 1.2 | 0 | 2.8 | 0.92 | 3.04 | 13.6 |
| 0.14 | 0.15 / 1 1.8 | 0 | 6.25 | 1.31 | 4.77 | 13.6 |
| 0.18 | 0 | 10 | 1.25 | 0.78 | 1.61 | 14.2 |
| 0.18 | 0.10 / 1 0.86 | 10 | 1.81 | 0.58 | 3.12 | 14.2 |

¹ Moles of H₂O added per mole of stigmasterol present.

The effect of adding increasing amounts of water in stage −1 is shown in Table II.

TABLE II
*Stripping stage data—Stage −1*

| H₂O added ¹ | Wt. cake, gm. | Cake assay, percent stig. | Wt. of solids in filt., gm. | Solids in filt. assay, percent stig. | $E_s$ | $E_n$ | $\beta$ |
|---|---|---|---|---|---|---|---|
| 0.69 | 9.7 | 4.0 | 24.5 | 4.9 | 0.32 | 0.40 | 0.81 |
| 1.28 | 5.3 | 12.2 | 28.9 | 5.5 | 0.41 | 0.17 | 2.39 |
| 2.05 | 8.0 | 11.3 | 26.1 | 4.9 | 0.71 | 0.29 | 2.47 |
| 2.3 | 10.1 | 8.7 | 24.5 | 3.8 | 0.94 | 0.39 | 2.41 |
| 2.56 | 10.1 | 10.5 | 23.8 | 4.7 | 0.95 | 0.40 | 2.39 |
| 2.56 | 11.4 | 9.4 | 22.7 | 3.7 | 1.27 | 0.47 | 2.69 |
| 3.84 | 9.9 | 7.7 | 23.6 | 5.6 | 0.58 | 0.41 | 1.40 |
| 5.12 | 11.6 | 8.6 | 21.6 | 5.8 | 0.80 | 0.52 | 1.53 |

¹ Moles of H₂O added per mole of stigmasterol present.

It can be seen from Table II that the effect of adding increasing amounts of water in stage −1 affords a definite increase in the $\beta$ value to a maximum, whereafter additional amounts of water cause the $\beta$ value to decrease.

From the foregoing, it can be seen that the process of this invention provides a method by which the $\beta$ value can be controlled, in particular increased, in the stripping stages. The water added in stage 0, for example, part of which carries over in the filtrate that is passed to stage −1 can be removed simply and easily by distillation, i.e., as a ternary azeotrope (when the extracting solvent used in the process is the n-heptane-ethylene dichloride azeotrope previously mentioned). After removal of water, the resulting dried filtrate is used in stage −1 to dissolve the stripped cake from stage −2; the resulting solution is then stripped using added water to increase selectivity of stripping, and the resulting cake is passed to stage 0 of the succeeding cycle. The filtrate is passed to the next stripping stage, i.e., stage −2, in such a system as shown in Figure 2.

In a system employing but two stripping stages, the filtrate from stage −1 is, of course, the residue. In the final stripping stage of a system employing four stripping stages, e.g., stage −3 of Figure 2, the filtrate from the preceding stripping stage, e.g., stage −2, is concentrated to a substantially reduced volume by distillation. This process removes the water previously added and provides, therefore, a dried solution containing the dissolved solids of the stage −2 filtrate. When a reduction in volume is reached which is suitable for the final stripping operation, this operation is carried out as previously described. The cake is passed to the succeeding cycle and the filtrate recovered as a process residue.

Table III further illustrates the effects on the $\beta$ value of adding gradually increasing amounts of water in stage 0.

TABLE III
*Stripping stage data—Stage 0*

| H₂O added ¹ | Wt. cake, gm. | Cake assay, percent stig. | Wt. of solids in filt., gm. | Solids in filt. assay, percent stig. | $E_s$ | $E_n$ | $\beta$ |
|---|---|---|---|---|---|---|---|
| 0.47 | 33.7 | 18.7 | 34.0 | 9.8 | 1.83 | 0.85 | 2.15 |
| 0.94 | 29.1 | 21.1 | 40.8 | 7.9 | 1.81 | 0.58 | 3.12 |
| 1.13 | 25.1 | 17.8 | 28.8 | 9.2 | 1.69 | 0.79 | 2.24 |
| 1.41 | 35.7 | 20.6 | 35.0 | 5.5 | 3.61 | 0.80 | 4.5 |
| 1.46 | 726.9 | 19.2 | 605.0 | 5.5 | 4.19 | 1.03 | 4.06 |
| 1.89 | 37.7 | 17.3 | 22.8 | 5.4 | 5.30 | 1.45 | 3.65 |
| 2.64 | 41.5 | 14.6 | 18.1 | 6.0 | 5.56 | 2.08 | 2.67 |
| 3.40 | 44.9 | 14.3 | 14.4 | 7.1 | 6.28 | 2.88 | 2.18 |
| 4.15 | 45.7 | 13.9 | 12.9 | 8.8 | 5.61 | 3.35 | 1.68 |

¹ Moles of H₂O added per mole of stigmasterol present.

Referring back to Table II, it can be seen that at stage −1 the $\beta$ value begins to drop at about three moles of added water per mole of stigmasterol present. The same effect is shown for stage 0 in Table III where the $\beta$ value begins to drop at about the same range of added water.

Table IV below shows the effect of added water on stage −2.

TABLE IV
*Stripping stage data—Stage −2*

| H₂O added ¹ | Wt. cake, gm. | Cake assay, percent stig. | Wt. of solids in filt., gm. | Solids in filt. assay, percent stig. | $E_s$ | $E_n$ | $\beta$ |
|---|---|---|---|---|---|---|---|
| Dry | 35.3 | 1.1 | 55.8 | 5.5 | 0.12 | 0.61 | 0.20 |
| 2.3 | 9.2 | 7.9 | 42.7 | 3.4 | 0.50 | 0.21 | 2.45 |
| 3.0 | 17.4 | 7.0 | 35.2 | 3.0 | 1.02 | 0.48 | 2.15 |
| 3.5 | 19.6 | 6.6 | 33.2 | 3.0 | 1.30 | 0.57 | 2.29 |
| 5.9 | 18.6 | 7.7 | 31.6 | 5.1 | 0.89 | 0.57 | 1.55 |
| 8.8 | 18.1 | 7.8 | 31.0 | 5.6 | 0.81 | 0.57 | 1.42 |
| 59.0 | 26.1 | 6.8 | 21.3 | 4.8 | 1.73 | 1.23 | 1.41 |

¹ Moles of H₂O added per mole of stigmasterol present.

In Table IV above it can be seen that as the range of added water reaches above 8.0 moles per mole of stigmasterol present, the addition of further water has little effect upon the $\beta$ value.

Table V below shows the effect of adding water in stage 1. This table illustrates that our invention is applicable to the early enriching stages as disclosed above, i.e., stages 1 and 2, as well as the stripping stages. It can be seen from Table V that the optimum amount of added water is reached at slightly more than two moles of water per mole of stigmasterol present, and that at about five moles of water per mole of stigmasterol present the $\beta$ value shows a net decrease in value.

TABLE V

*Stripping stage data—Stage 1*

| H₂O added [1] | Wt. cake, gm. | Cake assay, percent stig. | Wt. of solids in filt., gm. | Solids in filt. assay, percent stig. | $E_s$ | $E_n$ | $\beta$ |
|---|---|---|---|---|---|---|---|
| Dry | 47.3 | 26.7 | 51.2 | 13.7 | 1.78 | 0.81 | 2.2 |
| 0.114 | 77.2 | 23.5 | 70.3 | 12.6 | 2.05 | 0.96 | 2.13 |
| 1.14 | 77.1 | 23.7 | 69.0 | 13.7 | 1.93 | 0.99 | 1.95 |
| 1.72 | 37.3 | 24.7 | 35.0 | 12.3 | 2.14 | 0.92 | 2.34 |
| 2.3 | 38.2 | 26.2 | 33.9 | 7.5 | 3.94 | 0.90 | 4.38 |
| 3.44 | 56.3 | 20.2 | 9.7 | 8.5 | 13.8 | 5.06 | 2.73 |
| 5.01 | 4.71 | 24.3 | 51.1 | 16.1 | 1.39 | 0.83 | 1.67 |

[1] Moles of H₂O added per mole of stigmasterol present.

Reference is made to Figure 3 showing a practical embodiment of the invention by means of a flow diagram. The squares of the drawing represent stages in which slurries are (a) prepared, (b) equilibrated, and (c) filtered. A horizontal line of squares will be referred to as a "row." The drawing illustrates two rows in a plant operation which consists of six enriching stages and four stripping stages per cycle.

In the drawing, arrows slanting to the left represent liquid streams, i.e., filtrates proceeding from one stage (stage "n") to another stage (stage "n−1") except in the case of by-pass which will be explained in detail below. In stage −3 the arrow slanting to the left represents the residue filtrate which leaves the process. Leftward slanting arrows also show the addition of fresh solvent where needed in the process.

Arrows slanting to the right represent the flow of filter cakes proceeding from a stage (stage "n") to a succeeding stage (stage "n+1"). In stage 6 the arrow slanting to the right represents the final stigmasterol product of the process.

Arrows pointing vertically upward represent the removal of liquid from the process by distillation. This removal is carried out for the purpose of removing water by azeotopic distillation and for the further purpose of adjusting the solids concentration in any given stage to that required for the purpose of the stage, for example, stripping a stigmasterol-enriched cake from the solution.

Arrows pointing vertically downward represent water added in the stripping stages. In some of the stages, water is added to solutions already containing an appreciable amount of water; so the amount indicated as added does not represent the total effective amount present. The arrow pointing vertically downward in stage 1 represents feed soy sterols that are added. The fractions adjacent to the slanting arrows which represent the liquid and solid streams, and also the fractions contained in the squares representing stages, are the weight ratios of stigmasterol to the solids present. The percentage figures also represent these ratios. The volume of slurry in a stage prior to filtration is shown below the stage square. The sequential operations beginning with the step of filtration for the top row of stages are as follows, the term "set up" as used herein being substantially synonymous with the word "prepare."

FILTER STAGE 5 AND SET UP STAGE 6 OF NEXT ROW a. Pump one thousand gallons of fresh solvent into filter cake receiver.

b. Filter stage 5, reslurrying the cake in the solvent in filter cake receiver.

c. Set up stage 6 of next row by pumping the slurry to stage tank, heating to dissolve all the solids, and cool to crystallize preparatory to filtration. In this stage, a preliminary laboratory filtration is carried out, and $E_s$, $E_n$ and $\beta$ values are determined. The temperature is then adjusted prior to filtration in order to get the desired $E_s$ value.

FILTER STAGE 3 AND SET UP STAGE 4 OF NEXT ROW a. Pump stage 5 filtrate to the filter cake receiver.

b. Filter stage 3, receiving the cake in the stage 5 filtrate.

c. Set up stage 4 of the next row by pumping the slurry to a stage tank, adding three hundred gallons of fresh solvent, dissolving the slurried solids by heating, cooling to crystallize, performing preliminary laboratory filtration, etc. as with the stage above.

d. Store the filtrate from stage 3 in a storage tank preparatory for the by-pass feature which will be explained below.

FILTER STAGE 1 AND SET UP STAGE 2 OF NEXT ROW a. Pump three thousand gallons of fresh solvent into the filter cake receiver.

b. Filter stage 1, receiving the cake in the fresh solvent.

c. Set up stage 2 of the next row by pumping the slurry to a stage tank, dissolving, crystallizing, etc. as above.

FILTER STAGE −1 AND SET UP STAGE 0 OF NEXT ROW a. Pump stage 1 filtrate to the filter cake receiver.

b. Filter stage −1, receiving the cake in the stage 1 filtrate.

c. Set up stage 0 by pumping the slurried cake to a stage tank, distilling to adjust the concentration of solids to fall within the range previously described for stripping. Determine water content and cool the slurry to an intermediate temperature of about 55 degrees centigrade; add the requisite amount of water to achieve the desired increase in $\beta$ value; stir the solution for about one-half hour to assure solution of the added water; cool the stirred solution to about twenty degrees centigrade to crystallize a portion of the dissolved sterols; carry out preliminary filtration, determine the $E_s$ value, and adjust the temperature of the slurry accordingly.

FILTER STAGE −3 AND SET UP STAGE −2 OF NEXT ROW a. Pump stage −1 filtrate to the filter cake receiver.

b. Filter stage −3, receiving the cake in the stage −1 filtrate.

c. Set up stage −2 by distilling, preliminary cooling, adding water, and further cooling, as in stage 0.

d. Distill stage −3 filtrate to recover the azeotrope solvent, and save the residue for further recovery of sterols present.

The above operations complete the filtration steps of the upper row of stages, leaving the lower row of stages to be filtered. The lower row is treated as follows.

FILTER STAGE 6 (NO SET UP)

a. Filter a major proportion of stage 6 on the filter press; dry the cake as stigmasterol product. Leave the remainder of the slurry unfiltered in the stage tank, to be used as reflux to stage 5 of the succeeding row.

FILTER STAGE 4 AND SET UP STAGE 5 OF NEXT ROW a. Pump stage 6 filtrate to the filter cake receiver.

b. Filter stage 4, receiving the cake in the stage 6 filtrate.

c. Pump the slurry to the stage tank and combine with refluxed slurry from the stage 6 filtration. Add solvent, if necessary, to give desired solvent/solids ratio; heat to dissolve, cool to crystallize, etc. as for the set up of stage 6 above.

FILTER STAGE 2 AND SET UP STAGE 3 OF NEXT ROW a. Pump stage 4 filtrate to the filter cake receiver.

b. Filter stage 2, receiving the cake in the stage 4 filtrate.

c. Pump the slurry to stage tank and set up stage 3 of the next row as with stage 5 above.

FILTER STAGE 0 AND SET UP STAGE 1 OF NEXT ROW a. Pump stage 2 filtrate to the filter cake receiver.

b. Filter stage 0, receiving the cake in the stage 2 filtrate.

c. Set up stage 1 by the following procedure. This includes the by-pass feature of this invention.

(1) Pump the slurry from the filter cake receiver to the stage tank.

(2) Heat to dissolve; distill to remove water from the solution.

(3) Dissolve six thousand pounds of feed sterols in 2300 gallons of fresh solvent, add fifty pounds of filter aid for clarification purposes, distill to remove water, filter, and add to the solution in the stage tank.

(4) Pump stage 3 filtrate (from storage) into the stage tank, cool entire mixture to crystallize, carry out preliminary filtration, etc., and complete set up as for stage 6 above.

FILTER STAGE −2 AND SET UP STAGE −1 OF NEXT ROW a. Pump stage 0 filtrate to the filter cake receiver.

b. Filter stage −2, receiving the cake in the stage 0 filtrate.

c. Set up stage −1 by pumping the slurry to a stage tank, distilling to adjust the concentration of solids, and stripping the resulting solution as described above for stage 0.

SET UP STAGE −3 OF NEXT ROW a. Pump stage −2 filtrate to stage tank.

b. Strip as described for stage 0.

The foregoing illustrative procedure is taken from a large-scale process for separating stigmasterol from a feed of mixed soy sterols, the entire process having been operated a sufficiently long time so that steady state conditions prevail. As can be seen, the stigmasterol product is of extremely high quality, the yield is very high, and the stigmasterol content of the process residue is very low. The efficiency of stripping contributes materially to the two latter features, i.e., high overall yield of stigmasterol product and low stigmasterol content of the residue.

The foregoing example, including Figure 3 of the drawings, discloses an additional novel feature of this invention, i.e., the by-pass feature, as more particularly illustrated in the by-passing of stage 3 filtrate (upper row) to stage 1 set up (third row, not shown). By this procedure, as can be seen from Figure 3, the stage 3 filtrate passes by stage 2 of the lower row where it would normally enter. Instead of stage 3 filtrate, fresh make-up solvent is added to stage 2. This illustrative by-pass is an embodiment of an improvement gained by manipulating the flow of materials in the stages of a process as described above, so as to increase surprisingly the efficiency of the overall operation. It is based upon our discovery of the relationship between the variables that exist in a system employing a mixture of sterols containing sigmasterol, e.g., soy sterols, when employing as countercurrent selective separation solvent a mixture of a halogenated lower aliphatic hydrocarbon and a lower aliphatic hydrocarbon, particularly the azeotrope of ethylene dichloride and n-heptane. It relates particularly to controlling the flow of solvent, and by-pass thereof, in a stabilized countercurrent system in such a manner that fewer enriching stages are required to produce an equivalent or better yield of equivalent or better quality stigmasterol product.

When the process as described herein has come to steady state conditions, we have found that a given variation in the $E_s$ value results in a variation in yield of enriched stigmasterol cake of a given predetermined quality. We have discovered that the variation in overall yield which responds to a given variation in $E_s$ value is quite different at different stages. In other words, the sensitivity of the overall yield to $E_s$ variations varies from stage to stage. For example, a variation in $E_s$ value at stage 1 will normally result in a much greater yield difference for a given quality final stigmasterol product than will result from the same variation in $E_s$ value at stage 6. This sensitivity of the overall yield to $E_s$ variations is an unique result of the physical relationships between materials (material balances) and the number and arrangement of stages in the process. We have found that this uniqueness can be utilized advantageously to increase the overall yield of stigmasterol. This is done by by-passing the filtrates obtained from one or more of the first four enriching stages, i.e., stages 1, 2, 3 or 4 of any row, around the succeeding row, and entering said filtrates into stages −1, 0, 1 or 2, respectively, of the next succeeding row. When such a filtrate is by-passed in one or more of these manners, it is possible to operate the process at a maximum value of $E_s$ without serious impairment of the quality of the final stigmasterol product.

Illustratively, the use of stage 3 to stage 1 by-pass by manipulation such as described above, affords the production of stigmasterol product of 90.8 percent average quality, using six enriching stages and two stripping stages, with an overall stigmasterol yield of 65.3 percent. Under otherwise comparable conditions, but without by-pass, production of 90.1 percent quality stigmasterol product requires eight enriching stages and two stripping stages with an overall yield of 52.4 percent.

Instead of by-passing stage 3 to 1 as is illustrated in Figure 3, it is likewise feasible as noted above to by-pass stage 4 to stage 2, stage 2 to stage 0, or stage 1 to stage −1. The two stages involved in the by-passing of a particular filtrate can be determined by observing the quality of materials moving through the system. The by-pass points are selected so as to obviate mixing streams containing sterols having markedly unequal stigmasterol content. It is feasible moreover to by-pass the filtrate around more than one stage, if necessary, to combine it with a cake of similar stigmasterol content.

It is to be understood that the invention is not to be limited to the exact details of operation or exact materials shown and described, as obvious modifications and equivalents will be apparent to one skilled in the art, and the invention is therefore to be limited only by the scope of the appended claims.

We claim:

1. In a process for the separation and purification of stigmasterol and sitosterols by the extraction of sitosterols from a starting solid stigmasterol and sitosterols mixture consisting essentially of stigmasterol and sitosterols which comprises contacting the starting solid stigmasterol and sitosterols mixture with a selective organic solvent having the following characteristics; (1) a greater solvent affinity for the siteosterols as determined on a test portion of said starting solid stigmasterol and sitosterols mixture by employing a volume of the organic solvent which dissolves approximately one-half of the solids of the test portion of the said starting solid stigmasterol and sitosterols mixture, and (2) a relative distribution coefficient ($\beta$) in said test greater than 1.5, said relative distribution coefficient ($\beta$) being determined according to the formula:

$$\beta = \frac{S_c \times NS_{ml}}{NS_c \times S_{ml}}$$

wherein $S_c$ is the stigmasterol content in percent of the undissolved solids, $NS_c$ is the non-stigmasterol content in percent of the undissolved solids (by difference), $S_{ml}$ is the stigmasterol content in percent of the dissolved solids in the mother liquor, and $NS_{ml}$ is the non-stigmasterol content in percent of the dissolved solids in the mother liquor (by difference), to cause selective extraction of the sitosterols from the stigmasterol, separating the solid material phase which is enriched in stigmasterol content from the organic solvent phase which is enriched in sitosterols content, and continuing the extraction process in a countercurrent manner, passing said solid material phase through a series of enriching stages to a stigmasterol-enriched end product, and passing said organic solvent phase through said series of enriching stages in reverse order and thence through a series of stripping stages from each of which is obtained a stigmasterol-poor solution and a cake stripped therefrom containing stigmasterol, said solutions and said stripped cakes travelling countercurrently with respect to each other, the improvement which comprises adding to at least one of the stripping stages and the first two enriching stages between 0.5 and twelve moles of water per mole of stigmasterol present, in an amount within this range sufficient to increase the $\beta$ value of said selective organic solvent in said stage.

2. The process of claim 1 wherein the amount of water added is from about 2 to about 3 moles per mole of stigmasterol in the first stripping stage, from about 2 to about 4 moles per mole of stigmasterol in the second stripping stage and from about 2 to about 6 moles per mole of stigmasterol in the third stripping stage.

3. The process of claim 1 wherein the starting solid stigmasterol and sitosterols mixture is a mixture of soy sterols and the selective organic solvent is the azeotrope of n-heptane and ethylene dichloride.

4. A process for the separation and purification of stigmasterol and sitosterols by the extraction of sitosterols from a starting solid stigmasterol and sitosterols mixture consisting essentially of stigmasterol and sitosterols, which comprises contacting the starting solid stigmasterol and sitosterols mixture with a selective organic solvent having the following characteristics: (1) a greater solvent affinity for the sitosterols as determined on a test portion of said starting solid stigmasterol and sitosterols mixture by employing a volume of the organic solvent which dissolves approximately one-half of the solids of the test portion of the said starting solid stigmasterol and sitosterols mixture, and (2) a relative distribution coefficient ($\beta$) in said test greater than 1.5, said relative distribution coefficient ($\beta$) being determined according to the formula:

$$\beta = \frac{S_c \times NS_{ml}}{NS_c \times S_{ml}}$$

in which process said selective organic solvent passes through a series of stages wherein dissolved sterols including stigmasterol are stripped therefrom, and between 0.5 and twelve moles of water per mole of stigmasterol present is added to at least one of the group consisting of the first two enriching stages and the stripping stages, thereby to increase said $\beta$ value.

5. The process of claim 4 wherein the amount of water added is from about 2 to about 3 moles per mole of stigmasterol in the first stripping stage, from about 2 to about 4 moles per mole of stigmasterol in the second stripping stage and from about 2 to about 6 moles per mole of stigmasterol in the third stripping stage.

6. The process of claim 4 wherein the starting solid stigmasterol and sitosterols mixture is a mixture of soy sterols.

7. The process of claim 4 wherein the organic solvent is the azeotrope of n-heptane and ethylene dichloride.

8. In a countercurrent selective solvent separation of stigmasterol from a mixture of sterols containing stigmasterol by extraction with an organic solvent comprising a mixture of a halogenated lower aliphatic hydrocarbon and a lower aliphatic hydrocarbon wherein stigmasterol-enriched cakes pass in a forward direction countercurrently through a series of organic solvent phases in order to separate non-stigmasterol material from said cakes, and said organic solvent phases pass in a direction opposite to the direction of said cakes, the improvement which comprises by-passing at least one of said organic solvent phases around at least one of said cakes in such a manner as to substantially match the stigmasterol content of the solids dissolved in said organic solvent phases with the stigmasterol content of said cakes to be extracted thereby.

9. The process of claim 8 wherein the forwardly passing cakes and the countercurrently passing organic solvent phases are mixed in a series of stages thereby to produce a corresponding series of stigmasterol-containing cakes and organic solvent phases generally poorer in stigmasterol than said cakes and including at least six stages of enrichment of said cakes in stigmasterol, and wherein the by-passing of organic solvent phases is carried out in the first four of said stages of enrichment.

10. The process of claim 9 in which the mixture of sterols is a mixture of soy sterols and the organic solvent is the azeotrope of n-heptane and ethylene dichloride.

References Cited in the file of this patent
UNITED STATES PATENTS

| | | |
|---|---|---|
| 2,730,536 | Feeney | Jan. 10, 1956 |
| 2,835,682 | Steiner et al. | May 20, 1958 |
| 2,839,544 | Greiner et al. | June 17, 1958 |

UNITED STATES PATENT OFFICE
CERTIFICATE OF CORRECTION

Patent No. 2,905,677                 September 22, 1959

Glen A. Fevig et al.

It is hereby certified that error appears in the printed specification of the above numbered patent requiring correction and that the said Letters Patent should read as corrected below.

Column 3, line 30, for "of non-stigmasterol" read -- of stigmasterol --; column 7, line 33, for "stake" read -- stage --; column 8, lines 16 and 17, for "use of $E_S$ values" read -- use of low $E_S$ values --; column 11, line 18, Table V, second column thereof, last item, for "4.71" read -- 47.1 --.

Signed and sealed this 15th day of March 1960.

(SEAL)
Attest:

KARL H. AXLINE                                ROBERT C. WATSON
Attesting Officer                             Commissioner of Patents